United States Patent [19]

Aratani

[11] 4,442,254

[45] Apr. 10, 1984

[54] POLYAMIDE RESIN COMPOSITION

[75] Inventor: Yutaka Aratani, Suwa, Japan

[73] Assignee: Sumitomo Chemical Company, Limited, Osaka, Japan

[21] Appl. No.: 490,203

[22] Filed: Apr. 29, 1983

[30] Foreign Application Priority Data

May 17, 1982 [JP] Japan .................................. 57-83456

[51] Int. Cl.$^3$ ........................... C08K 3/10; C08K 3/04
[52] U.S. Cl. .................................... 524/413; 524/496; 524/606
[58] Field of Search ................................ 524/413, 606

[56] References Cited

U.S. PATENT DOCUMENTS 3,962,524  6/1976  Miyamoto et al. .................. 524/606
3,968,071  7/1976  Miyamoto et al. .................. 524/606
4,009,043  2/1977  Preis ..................................... 524/413

FOREIGN PATENT DOCUMENTS 53-4066  1/1978  Japan .................................. 524/606

Primary Examiner—Lewis T. Jacobs
Attorney, Agent, or Firm—Stevens, Davis, Miller & Mosher

[57] ABSTRACT

A polyamide resin composition comprising 20 to 90% by weight of a polyamide resin formed by the reaction of a xylylenediamine and an aliphatic straight-chain dicarboxylic acid having 6 to 12 carbon atoms, 5 to 60% by weight of carbon fiber, and 5 to 60% by weight of potassium titanate fiber.

5 Claims, No Drawings

POLYAMIDE RESIN COMPOSITION

This invention relates to a xylenediamine-base polyamide resin composition reinforced by the incorporation with carbon fiber and potassium titanate fiber and capable of producing molded products of excellent mechanical properties. More particularly, it relates to a resin composition particularly suitable for molding precision machine parts, in which a polyamide resin (hereinafter referred to as MX-nylon) formed by the reaction of a xylylenediamine and an aliphatic straight-chain dicarboxylic acid is compounded with carbon fiber and potassium titanate fiber to impart to the composition dimensional stability as well as high strength over a wide humidity range.

Compositions comprising polyamide resins such as nylon 6 and nylon 66 compounded with glass fiber or powdered inorganic fillers are well known. Owing to the improvement in strength and rigidity resulted from the loading with glass fiber, such compositions are useful in the field where the base resin, when used alone, is unsuitable because of its insufficient mechanical strength. On the other hand, compositions containing powdered inorganic fillers are useful, because of the reduction in anisotropy and curling which are disadvantages of the glass fiber-reinforced compositions caused by the orientation of glass fiber.

Nevertheless, in molding those parts which are small in size, weighing only from 10 mg to 10 g, or those having thin-walled portins as small as 1 mm or less in thickness, or having sharp projections such as gears, the flow of long glass fibers in the molten glass-reinforced material becomes insufficient in such portions, resulting in reduced fiber content of these portions relative to remaining portions and bringing about insufficiency in rigidity and mechanical strengths owing to insufficient reinforcing effect. Moreover, the orientation of glass fibers causes the occurrence of anisotropy and curling of the molded article, making it difficult to achieve precision molding. As compared with the glass-reinforced articles, those filled with powdered inorganic materials are inferior in mechanical strengths and ridigity, though they have advantages of improved uniformity of filler distribution and decreased anisotropy or curling.

In any case, although the compositions based on a polyamide resin such as nylon 6 or nylon 66 show comparatively good mechanical strengths in dry condition, they are hygroscopic and lose to a considerable extent in strengths and rigidity on absorption of moisture under an atmosphere of high humidity. Further, the above conventional polyamide-base compositions show a large viscosity change in molding operation, giving rise to considerable flash (leakage of molten compounds from the cavity through the parting lines of molds, which upon cooling leaves solidified flash on the molded article). The flash must be removed by post-finishing and interferes with precision molding.

As stated above, conventional compositions based on a polyamide such as nylon 6 or nylon 66 have fatal disadvantages in physical properties as well as in processability and it is substantially impossible to use such compositions especially in molding precision machine parts.

Under the circumstances, the present inventors carried out an extensive study to develop a composition free from the aforementioned difficulties. This invention is predicated on the finding that a composition comprising a xylylenediamine-base polyamide resin having a specific structure and, incorporated therein, a combination of carbon fiber and potassium titanate fiber gives, without flash, an injection-molded product having thin-walled portions and sharp projections, which meets the requirements for an article of high dimensional precision, said molded article having high strengths throughout the whole article including extreme points and an excellent moisture resistance.

The xylylenediamine-base polyamide resins or "MX-nylons", as herein referred to, are prepared by reacting a xylylenediamine with an aliphatic straight-chain dicarboxylic acid having 6 to 12 carbon atoms. The xylylenediamine suitable for use in the reaction is m-xylylenediamine (m-xylene-$\alpha,\alpha'$-diamine) or a mixture of 60 to 99% of m-xylylenediamene and 1 to 40% of p-xylylenediamine (p-xylene-$\alpha,\alpha'$-diamine). If the p-xylylenediamine content exceeds the said upper limit, the resulting resin will have too high a melting point and become difficulty processable by common molding methods.

The aliphatic straight-chain dicarboxylic acids having 6 to 12 carbon atoms are those aliphatic dicarboxylic acids represented by the general formula $HOOC(CH_2)_nCOOH$ ($n=4-10$), such as, for example, adipic acid, suberic acid, sebacic acid, and 1,11-undecanedicarboxylic acid. The MX-nylon prepared by using adipic acid as the aliphatic dicarboxylic acid is especially suitable, because it gives a molded product having well-balanced properties.

The carbon fiber suitable for use in the present composition is any of those derived from acrylonitrile and pitch, which have an average fiber length of 0.1 to 10 mm and an average fiber diameter of 3 to 20 $\mu$m. Those chopped fibers or rovings, about 6 mm in length and about 5 to 15 $\mu$m in diameter, which are commonly used in filling resins are used. It is desirable, though not necessary, to treat the surface of carbon fibers with various treating agents such as, for example, epoxy, polyamide, polycarbonate, and polyacetal resins.

The potassium titanate fiber used in this invention is one of the high-tenacity single-crystal fibers (whiskers). It is a needle crystal having a basic chemical composition $K_2O.6TiO_2$ or $K_2O.6TiO_2.\frac{1}{2}H_2O$ and a representative melting point of 1,300° to 1,350° C.; it has an average fiber length of 5 to 50 $\mu$m, preferably 20 to 30 $\mu$m, and an average fiber diameter of 0.05 to 1.0 $\mu$m, preferably 0.1 to 0.3 $\mu$m. It is used as such or after surface treatment with silane coupling agents such as aminosilanes and epoxysilanes, chromic chloride, and other surface treating agents suitable for the purpose of use, in order to impart to the surface of fiber an affinity for MX-nylons.

The effective mixing ratio of the ingredients in the present composition is 20 to 90% by weight of MX-nylon, 5 to 60% by weight of carbon fiber, and 5 to 60% by weight of potassium titanate fiber (the total of carbon fiber and potassium titanate fiber is 10 to 80% by weight based on total weight of the resin composition). If the total of carbon and potassium titanate fibers exceeds 80% by weight of the resin composition and the amount of MX-nylon is below 20% by weight, the mixing becomes insufficient for the formation of uniform composition, and the mold flow of the composition is hindered, rendering the molding impossible. If the total of both fibers is below 10%, a sufficient reinforcing effect is not exhibited. Even when the total amount of both fibers is 10 to 80% by weight, if the amount of carbon fiber is below 5% by weight, no satisfactory improvement in mechanical strengths is achieved, whereas if the amount of potassium titanate fiber is below 5% by weight, the reinforcing effect on the sharp projections or the reduction of anisotropy in mold shrinkage becomes insufficient. If the amount of carbon fiber exceeds 60% by weight, the mixing becomes difficult owing to a large difference in bulk density between the pelletized MX-nylon and the carbon fiber, resulting in non-uniform composition due to the difficulty in compounding. If the amount of potassium titanate fiber exceeds 60% by weight, there occurs marked deterioration in mold flow of the composition and strengths of the molded product.

The precision machine parts, as herein referred to, include (1) small-size molded parts, each weighing 10 mg to 10 g, (2) molded parts having thin-walled portions of 1 mm or less in thickness, and (3) molded parts having sharp projections, and are used in precision mechanisms such as watches, cameras, duplicators, and the like, which are required to be of high dimensional precision. Examples of such precision machine parts include various types of gears, cams, bushings, pulleys, axles, and the like, for which high mechanical strengths are prerequisites.

The present resin composition may contain, if necessary, one or more of the additives such as flame retardants, thermal stabilizers, lubricants, and others so far as the physical properties characteristic of the composition are not adversely affected.

Injection molded products are obtained from the present composition either by feeding directly to the hopper a mixture of predetermined quantities of MX-nylon, carbon fiber, and potassium titanate fiber or by use of a pelletized composition. The pelletization is performed by continuously feeding measured quantities of MX-nylon and both fibers by means of a measuring and feeding device such as screw feeder, table feeder or belt feeder to a single- or twin-screw extruder, extruding the molten and milled mixture in the form of strand from the extruder, and cutting the strand to a pellet form by means of a cutter.

The resin composition of this invention has an adequate melt fluidity, small mold shrinkage, and reduced anisotropy, shows desirable moldability without appreciable flash even in molding compricated articles involving thin-walled portions and sharp projections, and is an excellent molding material capable of producing molded precision machine parts having excellent properties such as high strengths, high rigidity, and desirable moisture resistance due to reduced moisture absorption.

The invention is illustrated below in detail with reference to Examples of preferred embodiments of the invention, which are presented by way of illustration and not by way of limitation.

EXAMPLES 1 to 7

Pelletized poly(m-xylylene adipamide) having a relative viscosity of 2.30, as determined at 25° C. in a solution of 1 g of the polymer in 100 ml of 96-% sulfuric acid, carbon fiber (Magnamite 1800 AS of Hercules Co., U.S.A.) having a sectional diameter of $9\mu$ and an average fiber length of 6 mm, and potassium titanate fiber (TISMO-D of Otsuka Chemical Co., LTD.) having a sectional diameter of $0.2\mu$ and an average fiber length of $20\mu$ were mixed in the ratios as shown in Table 1. The resulting mixture was milled in molten state in an extruder (twin extruder, type PCM-30, of Ikegai Iron Works, Ltd.), then extruded, cooled in water, and cut into pellets to obtain a molding material. The pellets were dried under a hot air current at 120° C. for 3 hours. The dried material was moled in an injection molding machine (Sumitomo-Nestal, type N 47/28) under the following conditions:
  Molding temperature: 260°–280° C.
  Injection pressure: 600–1,000 kg/cm$^2$.
  Mold temperature: 130° C.
  Cooling time: 20 seconds.

The behavior of the material in molding was observed and the molded articles were tested for physical properties.

The following two types of molds were used:
  (A) Mold for rectangular plate specimen:
  Size of molded plate specimen:
  75 mm×12.7 mm×1.6 mm (thickness).
  Type of gate: side gate, 7 mm×1.6 mm (thickness).
  Number of cavities: single.
  (B) Mold for gear specimen:
  Dimension of molded gear specimen:
  Axle diameter, 0.6 mm; diameter of gear pitch circle, 6 mm; tooth thickness, 1.3 mm;
  tooth width, 0.5 mm.
  Gate: 0.4 mm $\phi$.
  Number of cavities: 8.

As is seen from Table 1, the composition of this invention showed desirable molding behavior, exhibiting neither flash nor curling of the molded product. Under both dry and humid conditions, the molded specimens showed a high flexural strength and a high flexural modulus. The present composition was found to be an excellent molding material for the production of precision machine parts, as evidenced by the high strengths of a molded gear of the present Examples, which was in a small and complicated form involving thin-walled portions.

COMPARATIVE EXAMPLES 1 to 4

Tests similar to those described in Examples 1 to 7 were performed on the compositions containing carbon fiber and potassium titanate fiber in ratios not herein specified. The results obtained were as shown in Table 1.

The compositions presented problems with respect to moldability and mechanical strengths and were found to be not suitable as molding materials for the production of precision machine parts.

COMPARATIVE EXAMPLES 5 and 6

Tests similar to those of Example 4 were carried out by using nylon 6 (Amilan CM 1001 of Toray Co.) or nylon 66 (Amilan CM 3001 N of Toray Co.) in place of the MX-nylon, the compounding ratios of carbon and potassium titanate fibers being the same as in Example 4. The results were as shown together with those of Example 4 in Table 1. Nylon 6 and nylon 66 were used in Comparative Examples 5 and 6, respectively.

The compositions of the present Comparative Examples exhibited considerable flash and curling of the molded product. The molded specimens showed a large decrease in mechanical strengths upon absorption of moisture. As a consequence, the compositions were not suitable as molding materials for the manufacture of precision machine parts.

TABLE 1

| | Compounding ratio (wt %) | | | Behavior in extruder feeding | (A) Mold for rectangular plate | | | | (B) Mold for gear | | | |
| | | | | | Flexural[1] strength ($\times 10^2$ kg/cm$^2$) | | Flexural[1] modulus ($\times 10^4$ kg/cm$^2$) | | Behavior in injection molding | | Gear strength[2] (g.cm) | |
| | Nylon | Carbon fiber | K titanate fiber | | Dry[3] | Humid[4] | Dry[3] | Humid[4] | Flash | Curling | Dry[3] | Humid[4] |
| --- | --- | --- | --- | --- | --- | --- | --- | --- | --- | --- | --- | --- |
| Example No. | | | | | | | | | | | | |
| 1 | 30 | 50 | 20 | o[5] | 32 | 28 | 26 | 23 | o[5] | o[5] | 28 | 25 |
| 2 | 30 | 20 | 50 | o | 28 | 25 | 22 | 18 | o | o | 24 | 20 |
| 3 | 60 | 5 | 35 | o | 25 | 20 | 17 | 12 | o | o | 23 | 20 |
| 4 | 60 | 20 | 20 | o | 30 | 25 | 20 | 15 | o | o | 30 | 27 |
| 5 | 60 | 35 | 5 | o | 35 | 30 | 23 | 18 | o | o | 31 | 28 |
| 6 | 80 | 5 | 15 | o | 22 | 17 | 13 | 10 | o | o | 20 | 17 |
| 7 | 80 | 15 | 5 | o | 25 | 20 | 16 | 11 | o | o | 21 | 18 |
| Comparative Example No. | | | | | | | | | | | | |
| 1 | 15 | 40 | 45 | x | | | | | Poor moldability | | | |
| 2 | 95 | 3 | 2 | o | 15 | 10 | 9 | 6 | o | o | 10 | 6 |
| 3 | 50 | 47 | 3 | o | 32 | 28 | 21 | 16 | o | x | 13 | 10 |
| 4 | 50 | 3 | 47 | o | 16 | 12 | 20 | 15 | o | o | 15 | 11 |
| 5 | 60 | 20 | 20 | o | 18 | 9 | 9 | 4 | x | x | 17 | 9 |
| 6 | 60 | 20 | 20 | o | 21 | 13 | 10 | 6 | x | x | 20 | 11 |

Note:
[1]Test specimen, 75 mm $\times$ 12.7 mm $\times$ 1.6 mm (thickness); span, 27 mm; rate of deformation, 2 mm/minute.
[2]Applied torque at rupture of gear teeth.
[3]Immediately after molding.
[4]After storage of test specimen for 6 days at 25° C. and 90% RH.
[5]o: good; x: poor.

What is claimed is:

1. A polyamide resin composition comprising 20 to 90% by weight of a polyamide resin formed by the reaction of a xylylenediamine and an aliphatic straight-chain dicarboxylic acid having 6 to 12 carbon atoms, 5 to 60% by weight of carbon fiber, and 5 to 60% by weight of potassium titanate fiber.

2. A composition according to claim 1, wherein the xylylenediamine is m-xylylenediamine or a mixture of 60 to 99% of m-xylylenediamine and 1 to 40% of p-xylylenediamine.

3. A composition according to claim 1, wherein the aliphatic straight-chain dicarboxylic acid having 6 to 12 carbon atoms is adipic acid, suberic acid, sebacic acid, or 1,11-undecanedicarboxylic acid.

4. A composition according to claim 1, wherein the carbon fiber is acrylnitrile-base or pitch-base carbon fiber and has an average fiber length of 0.1 to 10 mm and an average fiber diameter of 3 to 20 $\mu$m.

5. A composition according to claim 1, wherein the potassium titanate fiber has an average fiber length of 5 to 50 $\mu$m and an average fiber diameter of 0.05 to 1.0 $\mu$m.

* * * * *